(No Model.) 8 Sheets—Sheet 3.

F. M. & R. E. MONGER.
BAND CUTTER AND FEEDER FOR THRASHING MACHINES.

No. 303,584. Patented Aug. 12, 1884.

WITNESSES
Phil C. Dietrich.
T. R. Keyworth.

INVENTORS:
Francis M. Monger.
Rob't E. Monger.
by M. Alexander, Attorney (No Model.)  8 Sheets—Sheet 5.

F. M. & R. E. MONGER.
BAND CUTTER AND FEEDER FOR THRASHING MACHINES.

No. 303,584.  Patented Aug. 12, 1884.

WITNESSES  INVENTORS:

(No Model.)

F. M. & R. E. MONGER.

BAND CUTTER AND FEEDER FOR THRASHING MACHINES.

No. 303,584. Patented Aug. 12, 1884.

8 Sheets—Sheet 6.

WITNESSES
Phil C. Dieterich.
W. R. Keyworth

INVENTORS
Francis M. Monger.
Robert E. Monger.
By: M. Alexander
Attorney (No Model.) 8 Sheets—Sheet 7.
F. M. & R. E. MONGER.
BAND CUTTER AND FEEDER FOR THRASHING MACHINES.
No. 303,584. Patented Aug. 12, 1884.
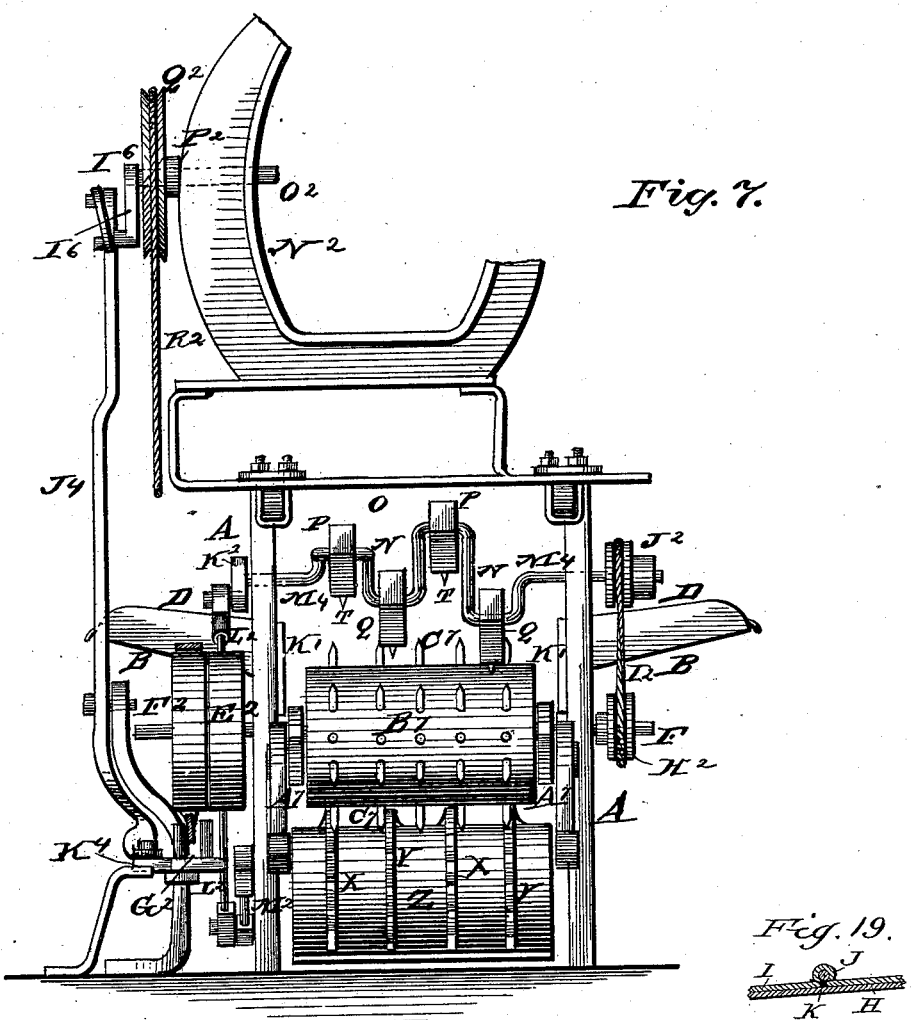
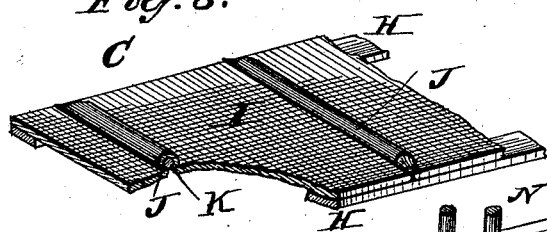
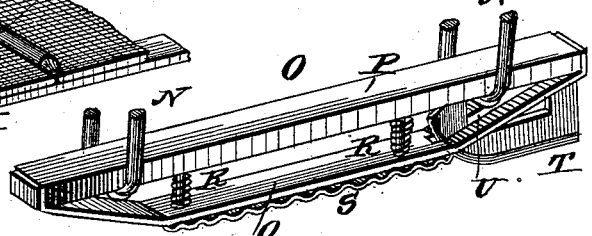
WITNESSES
Phil C. Dieterich.
W. R. Keyworth.
INVENTORS:
Francis M. Monger
Rob't E. Monger
By M. Alexander Attorney (No Model.) 8 Sheets—Sheet 8.
F. M. & R. E. MONGER.
BAND CUTTER AND FEEDER FOR THRASHING MACHINES.
No. 303,584. Patented Aug. 12, 1884.
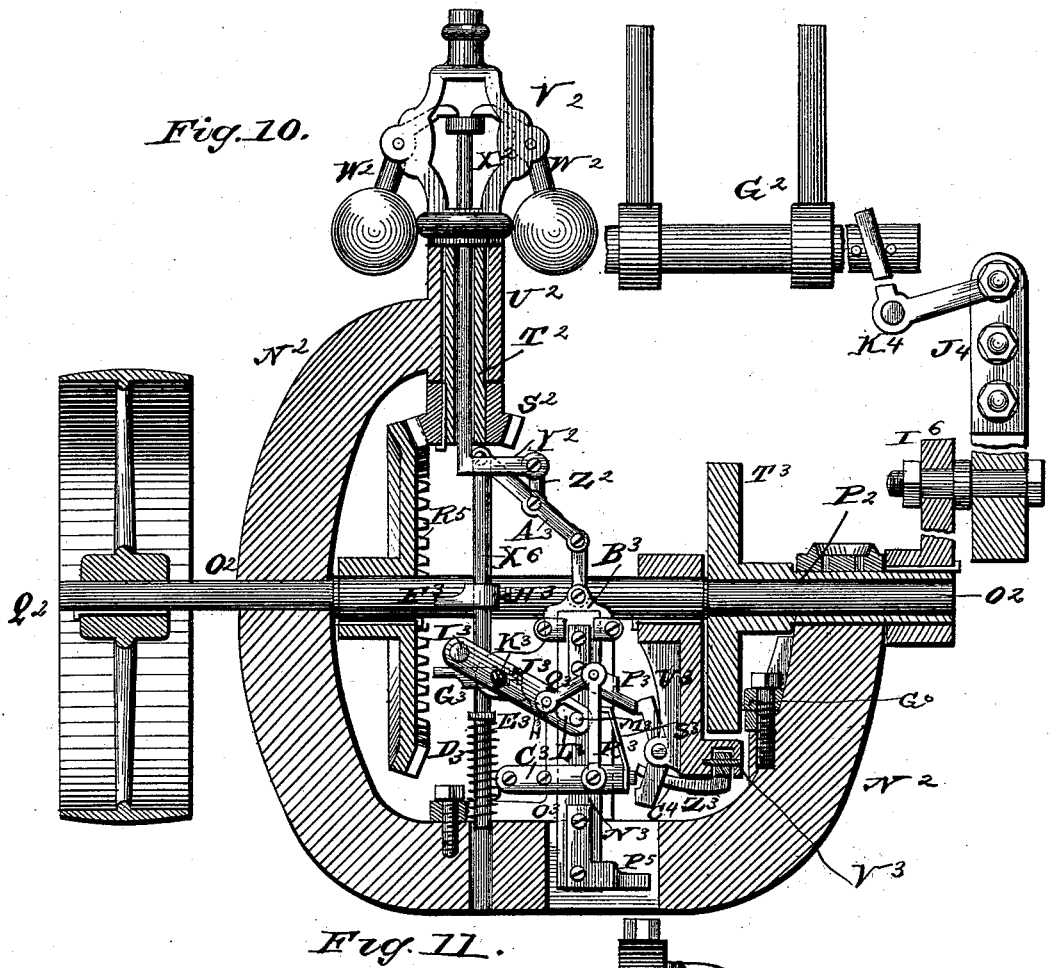
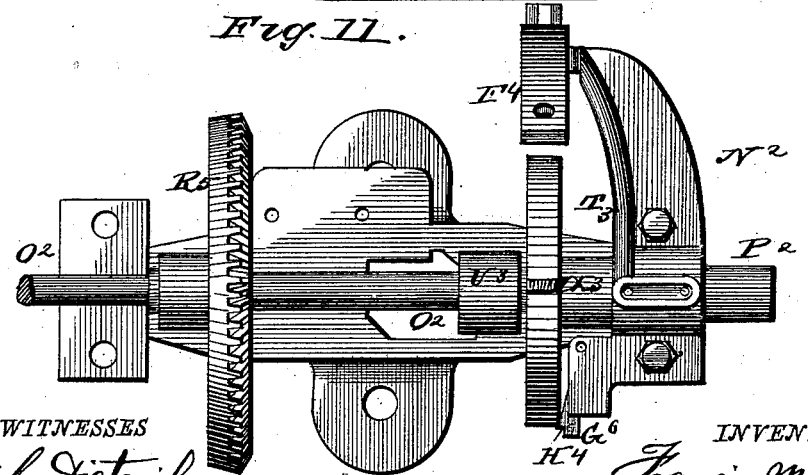
WITNESSES
Phil C. Dietrich
W. R. Keyworth
INVENTORS.
Francis M. Monger
Rob't E. Monger
by:
N. Alexander Attorney

UNITED STATES PATENT OFFICE.

FRANCIS M. MONGER AND ROBERT E. MONGER, OF CLEVELAND, ASSIGNORS TO THEMSELVES, AND CALVERY G. SAMPLES, OF GREENFIELD, INDIANA.

BAND-CUTTER AND FEEDER FOR THRASHING-MACHINES.

SPECIFICATION forming part of Letters Patent No. 303,584, dated August 12, 1884.

Application filed April 7, 1884. (No model.)

*To all whom it may concern:*

Be it known that we, F. M. MONGER and R. E. MONGER, of Cleveland, in the county of Hancock and State of Indiana, have invented certain new and useful Improvements in Band-Cutters and Feeders for Thrashing-Machines; and we do hereby declare that the following is a full, clear, and exact description thereof, reference being had to the accompanying drawings, and to the letters of reference marked thereon, which form part of this specification.

This invention relates to machines for feeding grain to thrashing-machines, and for automatically cutting the bands of the bundles as they are being fed to the cylinder of the machine, as will be fully understood from the following description and claims, when taken in connection with the annexed drawings.

We employ a governor and regulator, and consider it preferable in carrying out the invention, capable of being applied with like successful results to many other purposes; and as we propose to make it the subject of a separate application for Letters Patent, it has been herein shown and described only for the purpose of illustrating its operation in connection with our present invention.

Figure 1:
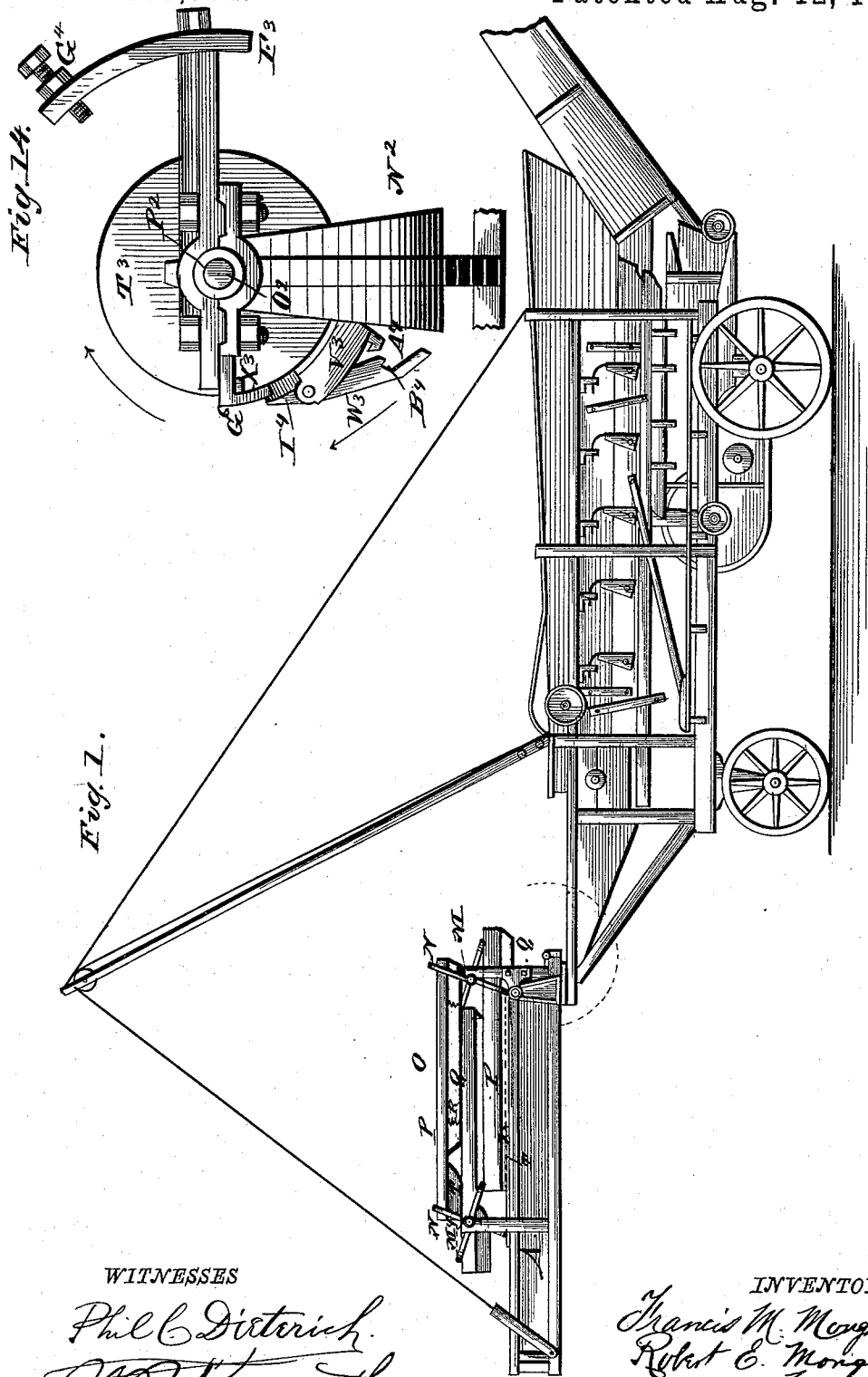
Figure 2:
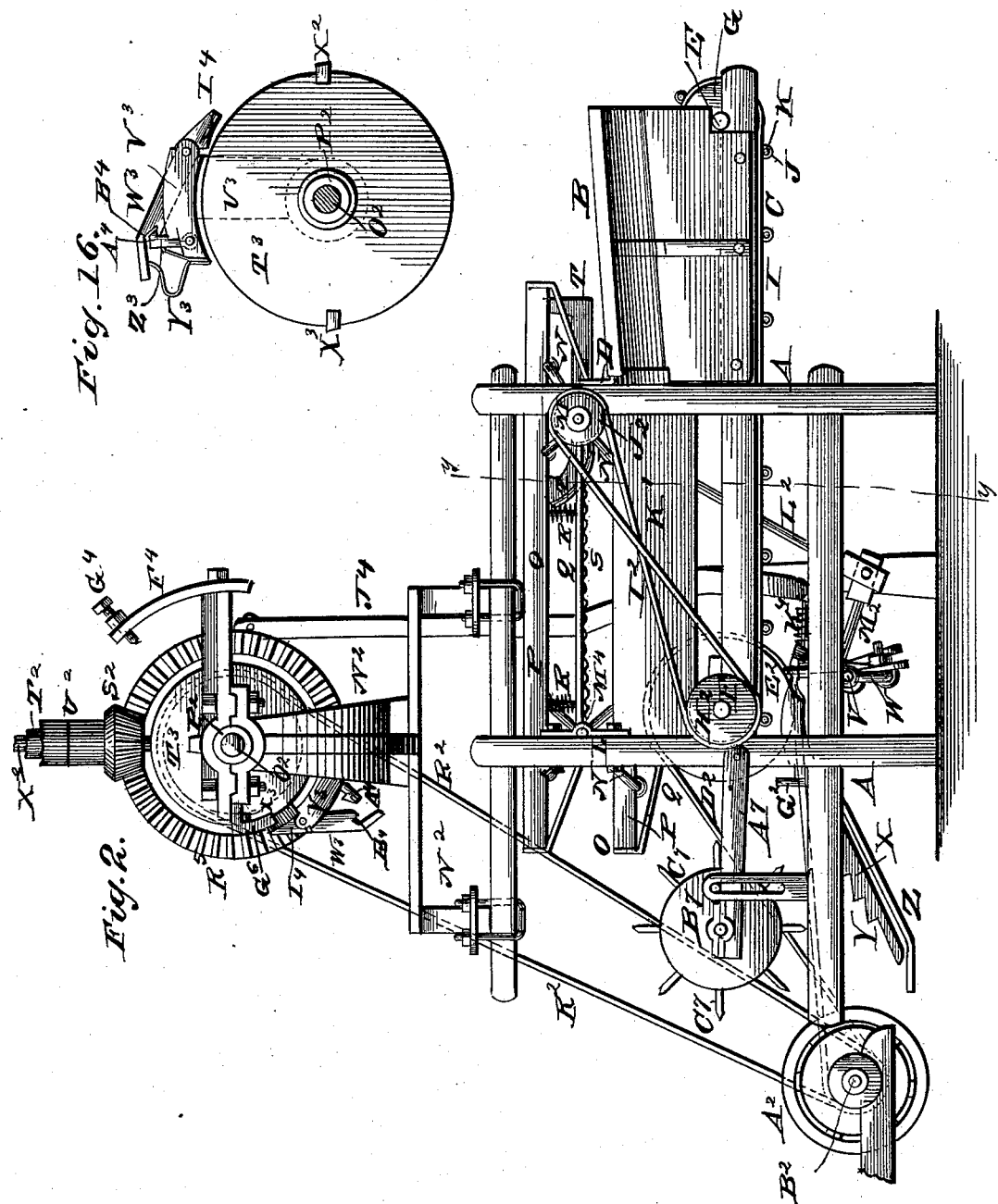
Figure 3:
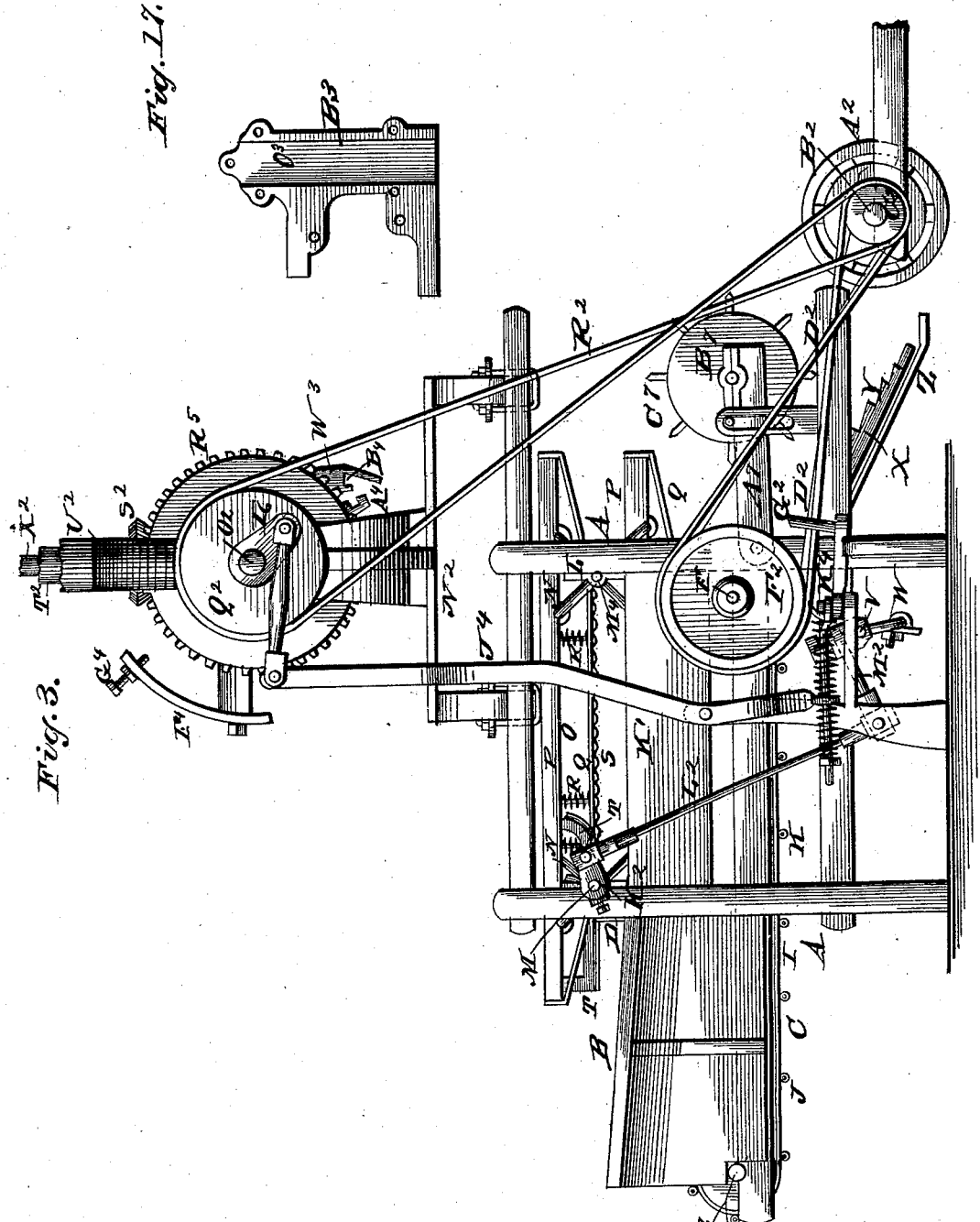
Figure 4:
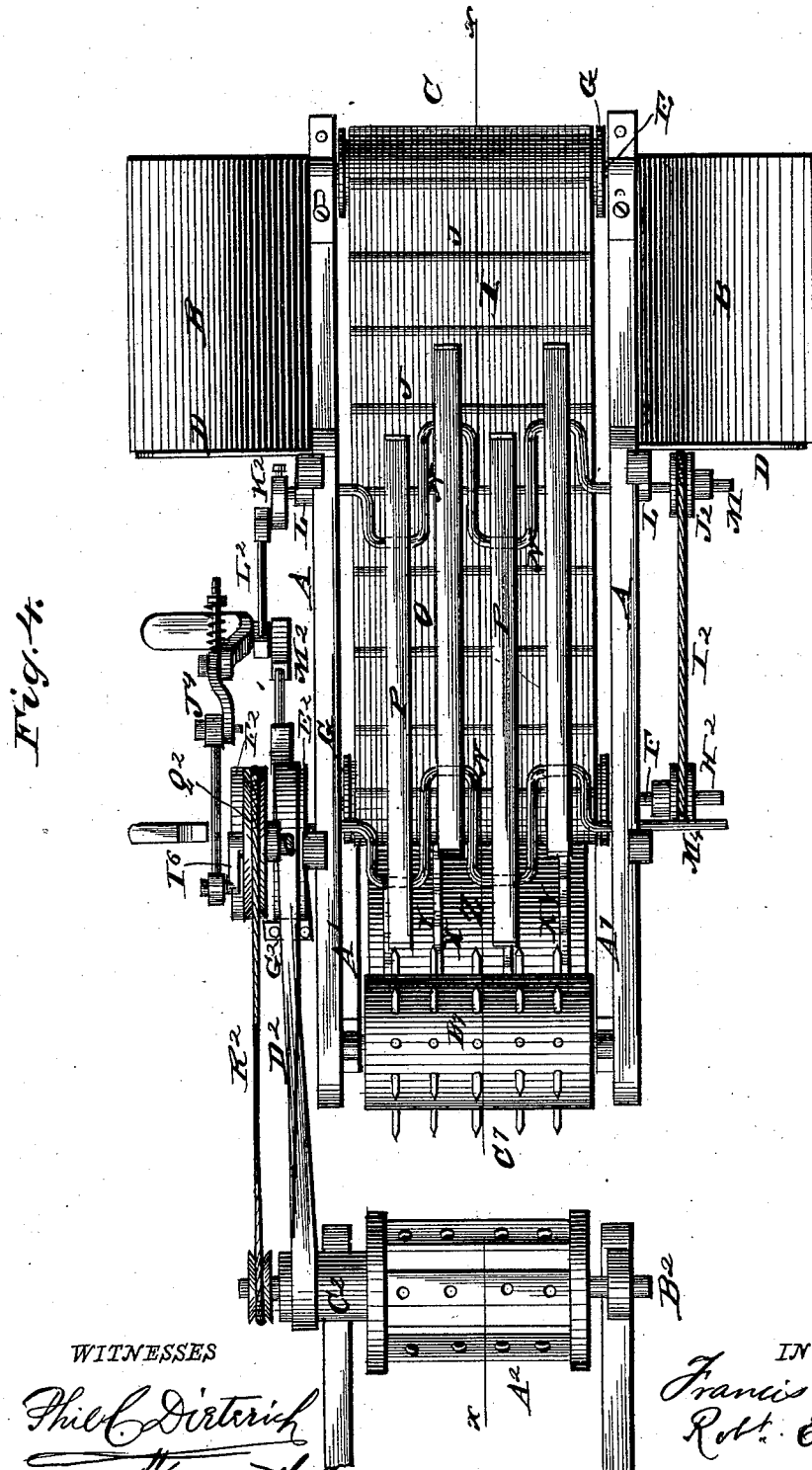
Figure 5:
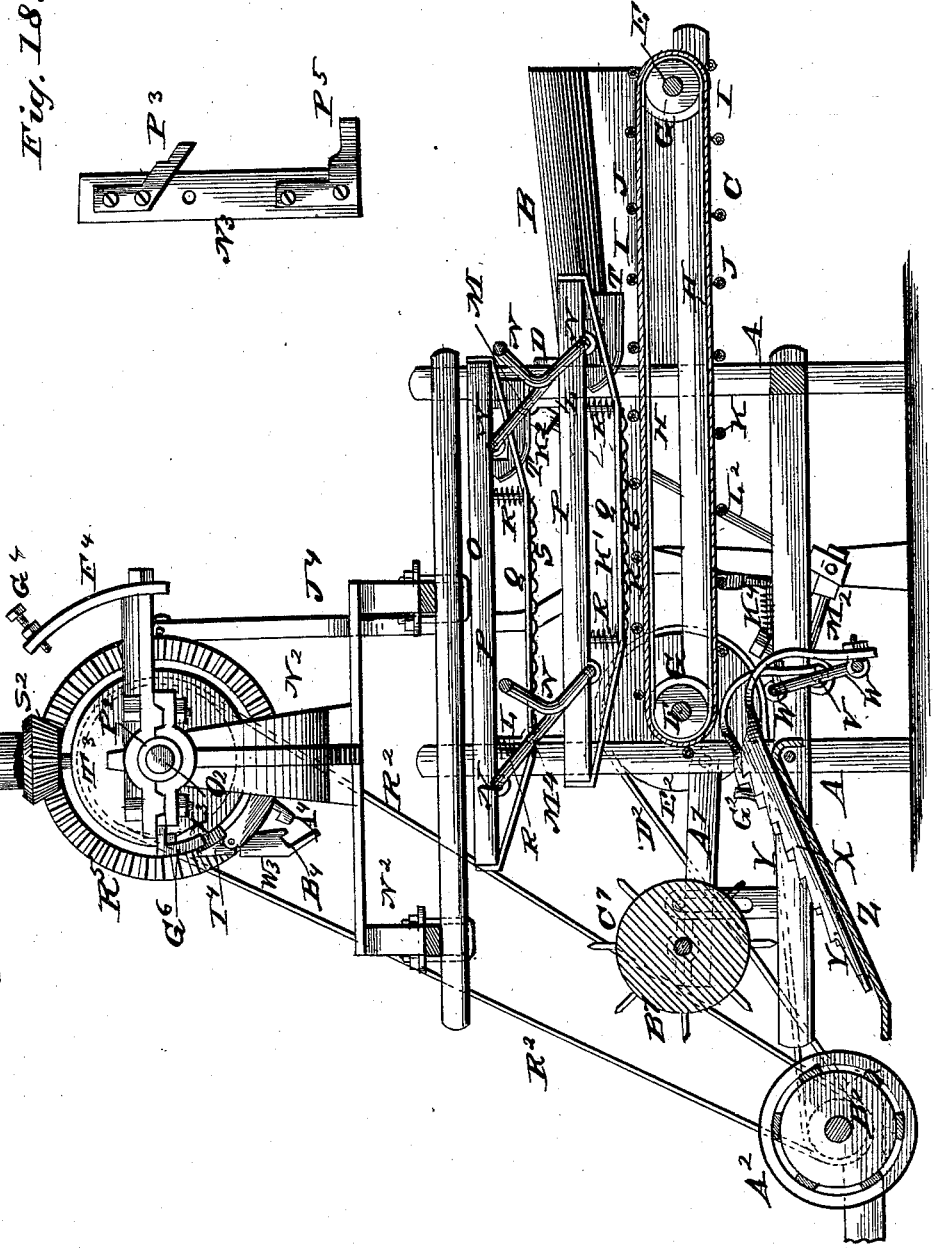
Figure 6:
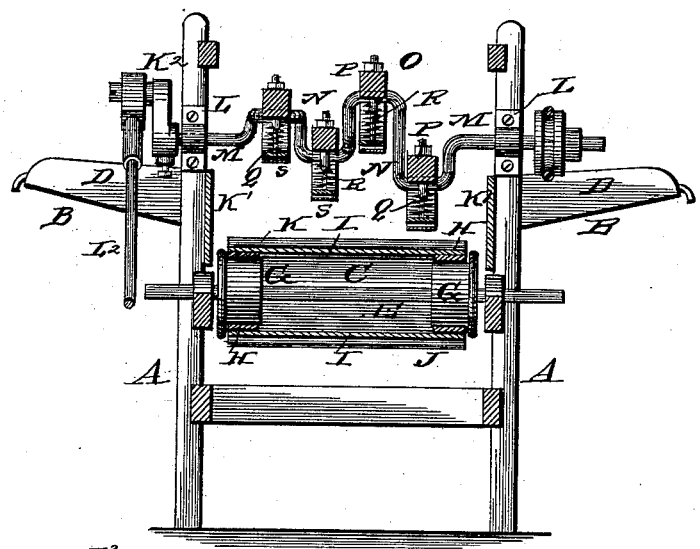
Figure 12:
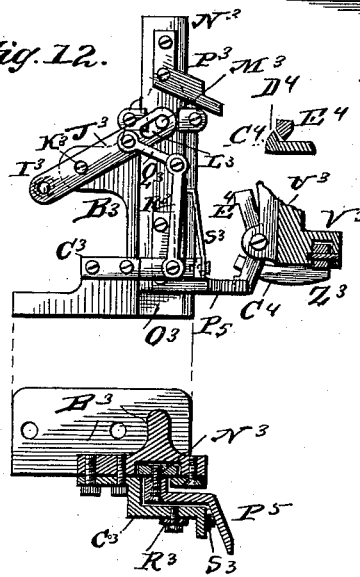
Figure 13:
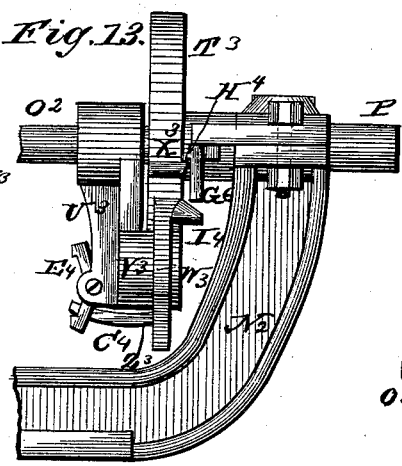
Figure 15:
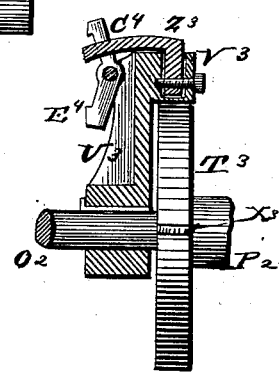

In the drawings hereto annexed, Figure 1 is a side view of the band-cutter and feeder, showing the same attached to a thrashing-machine for operation. Fig. 2 is a side view of the band-cutter and feeder regulating mechanism. Fig. 3 is a view of the opposite side of the same. Fig. 4 is a plan view of the same. Fig. 5 is a longitudinal section on the line $x\ x$ in Fig. 4. Fig. 6 is a transverse sectional view on the line $y\ y$, in Fig. 2. Fig. 7 is a rear view. Fig. 8 is a detail view of a portion of the feed-apron. Fig. 9 is a detail view, in perspective, of one of the upper feed-bars and band-cutters. Fig. 10 is a rear elevation, partly in section, of the governing and regulating mechanism. Fig. 11 is a plan view of a portion of the same, its upper part having been removed. Fig. 12 is a detail view showing the governing mechanism in a different position; and Figs. 13, 14, 15, 16, 17, and 18 are detail views illustrating various parts of the governing and regulating mechanism, to which reference will hereinafter be made. Fig. 19 is a section in detail, showing the manner of attaching the ribs or slats K to the endless apron.

The same letters refer to the same parts in all the figures.

A designates a suitably-constructed frame, the sides of which are provided at the front end with outwardly-extending inclined planes B B, upon which the bundles are placed and from which they are allowed to roll laterally down the said inclined planes, so as to reach the belt C in a position lengthwise thereof. This feed-apron is between the sides of the frame, as will be hereinafter described. The rear edges of the planes B are provided with guards or flanges D, to prevent displacement of the sheaves. The frame A is provided near its front and rear ends with bearings for the transverse shafts E and F, both of which have drums or pulleys G, for the belts or bands H of the apron I. The latter, which may be constructed of canvas or other suitable material, is provided with transverse sheaths, J, in which are placed ribs or slats, K, whereby the grain is fed with certainty and without danger of slipping. We form the sheaths J by folds of the apron itself, stitched as shown in Fig. 19. This construction, which is clearly shown in Fig. 8, is simple, and by it the ribs or slats are secured in the safest and most permanent manner. The sides of the frame are provided with guards K', adjoining the edges of the apron and serving to prevent the grain from sliding off when the apron is in motion. Bearings L are provided in the sides of the frame A for a pair of shafts, M M⁴, each of which is formed with a series of cranks, N, arranged at different angles, but in such a manner that the cranks of the two shafts shall register with each other. Mounted upon the said cranks are the feed-bars O O, each of which consists of a rigid bar, P, journaled upon the cranks, as shown, and having its front and rear ends connected by a flexible strap, Q, extending under the said bar, and held taut by means of a pair of suitable springs, R R. The under side of strap Q is shod with a strip or strips of corrugated or serrated metal, S, which not only prevents excessive wear upon the flexible strap, but serves to assist in feeding.

The front end of each of the bars P is provided with a curved knife or band cutter, T, which extends through a slit, U, in the flexible apron and serves to sever the bands of the bundles of grain after they have been deposited upon the apron.

Journaled in the lower rear part of the frame is a transverse shaft, V, having a series of cranks, W, upon which are mounted the rearward-extending feed-bars X, the upper sides of which are provided with teeth or ratchets Y. The rear ends of these feed-bars are free and rest or slide upon an inclined plane, Z, leading to the under side of the thrashing-cylinder $A^2$, Figs. 3 and 5.

The cylinder-shaft $B^2$ has a drum, $C^2$, from which motion is conveyed by a belt or band, $D^2$, to the rear apron-shaft F. The latter is provided at one end with loose and fixed pulleys $E^2$ and $F^2$, upon either of which the belt may be adjusted by a belt-shifter, $G^2$, operated automatically by the governing and regulating mechanism, as will be presently described. Shaft F carries at its other end a pulley, $H^2$, connected by a twisted band, $I^2$, with a pulley, $J^2$, upon the end of shaft M, to which motion is thus conveyed. The other end of shaft M has a crank, $K^2$, connected by a pitman, $L^2$, with a crank, $M^2$, upon the end of the rack-shaft V, to which an oscillating motion is thus communicated, whereby the feed-bars X, mounted upon the said shaft, shall be caused to reciprocate longitudinally when the machine is in operation.

When the belt $D^2$ is adjusted upon the fixed pulley $F^2$ of shaft E, the latter receives a rotary motion, which is thus imparted in the proper direction to the feed-apron. By the pulleys $H^2$ $J^2$ and band $I^2$, a rotary motion is likewise imparted to the crank-shaft M, and from thence by the rigid bars P to the shaft $M^4$. The motion of the feed-bars O is rearward, downward, forward, and upward, and they will thus, when at their lowest point, move in the same direction as the feed-apron. The curved knives at their forward ends will cut the bands of the bundles, and by the action of the feed-bars the grain will be spread in a longitudinal direction upon the apron, thereby causing the heads of the grain to reach the cylinder evenly and gradually, and thus causing the operation of thrashing to be effected evenly and gradually, and without danger of choking the machine. In case of a momentary overfeed, the flexible straps Q of the feed-bars will yield, thus preventing injury to the feed-bars or to the apron, and rendering the feed even, steady, and effective.

From the feed-apron the grain is dropped or deposited upon the reciprocating feed-bars X, which assist in scattering the grain, and which finally feed it to the cylinder of the thrashing machine.

$A^7$ $A^7$ are a pair of arms extending rearwardly from the frame A, to which they are hinged, and between these arms is mounted a feed-cylinder, $B^7$, equipped with teeth, $C^7$, which serves to assist the feed-bars in scattering the grain and supplying it to the cylinder of the thrashing-machine. It also serves to hold back the grain in case of overfeed, thus preventing the machine from being choked. In preparing the machine for transportation, this feed-cylinder will swing under the body of the feeding device, which latter, as hereinafter stated, swings over upon the deck of the separator.

The regulating and governing mechanism, to which reference has hereinbefore been made, is arranged in a frame, $N^2$, arranged on top of the frame A, and constructed in any suitable manner, substantially as shown in the drawings. Said mechanism comprises a transverse or counter-shaft, $O^2$, one end of which has its bearing in the frame $N^2$, and the other end of which is journaled in a sleeve, $P^2$, which is journaled in the opposite side of frame $N^2$. One of the projecting ends of shaft $O^2$ carries a pulley or drum, $Q^2$, to which motion is communicated by a belt, $R^2$, from the cylinder-shaft of the thrashing-machine. Shaft $O^2$ carries a rigidly-attached bevel-wheel, $R^5$, meshing with a pinion, $S^2$, upon the lower end of a sleeve, $T^2$, journaled in a bracket, $U^2$, of a frame, $N^2$, and constituting the shaft of a governor, $V^2$.

The governor arms $W^2$ consist of bell-crank levers, the inner ends of which rest upon the upper end of a stem, $X^2$, sliding vertically in the sleeve $T^2$, so that as the governor attains speed the stem $X^2$ will be depressed. The lower end of the stem $X^2$ has a laterally-extending arm, $Y^2$, which is connected by a pivoted link, $Z^2$, with a lever, $A^3$, having its fulcrum at the upper end of an upright, $B^3$, secured in the frame $N^2$, and held by a guard, $C^3$.

$D^3$ is a spring coiled around the lower portion of a vertically movable or sliding stem, $X^6$, and bearing against a collar, $E^3$, upon the latter, which is thereby forced in an upward direction. The upper portion of the stem $X^6$ is provided with two collars or washers, $F^3$ and $G^3$, adjustable by set-screws $H^3$, and into the space between the said washers extends a stud, $I^3$, formed upon one end of a lever, $J^3$, fulcrumed at $K^3$ upon the uprights $B^3$. The other end of the lever $J^3$ is provided with a slot, $L^3$, fitting over a stud, $M^3$, upon the face of a bar, $N^3$, sliding vertically in a groove, $O^3$, in the face of the uprights $B^3$. The bar $N^3$ is provided near its upper and lower ends with laterally-extending beveled arms $P^3$ $P^5$. The face of the lever $J^3$ is connected by a pivoted rod, $Q^3$, with an arm, $R^3$, pivoted to the face of the guard $C^3$, and acted upon by a spring, $S^3$, which serves to retain the parts in any position to which they may be adjusted.

The inner end of the sleeve $P^2$ has a disk, $T^3$, fixed upon it, adjoining which is a radial arm, $U^3$, fixed upon the shaft $O^2$, and having a lateral projection, $V^3$, extending over the periphery of the disk T³. Pivoted to the projection V³ is a dog or latch, W³, capable of engaging projections X³ upon the periphery of the disk T³, with which it is held in contact by the action of a spring, Y³, suitably arranged at the rear end of the said latch.

Z³ is a trigger pivoted transversely in the projection V³, and having a tooth, A⁴, engaging a notch, B⁴, in the rear end of the latch. The trigger Z³ has a laterally-extending arm, C⁴, the face of which is provided with a triangular projection, D⁴, engaging one of the arms of a lever, E⁴, pivoted to the side of the arm U³. It will be observed that by moving the lever E⁴ in either direction the trigger Z³ will be operated and the latch tripped, bringing its front end down against the periphery of the disk T³, and engaging one of the teeth or projections upon the said disk, which will thus be caused to make a part revolution.

F⁴ is a segmental arm extending from the front part of the frame, and equipped with a set-screw, G⁴, adapted to bear against the rear end of the latch, so as to release the latter from contact with the periphery of disk T³, and throw it into engagement with the trigger when the disk T³ has made a one-half revolution.

G⁶ is a lever pivoted to the frame N², and provided with a shoulder, H⁴, and actuated by a suitably-arranged spring, so as to engage lateral extensions of the teeth or projections X³, thus forming a rest, the function of which is to retain the disk T³ in any position to which it may be adjusted. This lever or rest is operated and released from the disk T³, so as to allow the latter to start when required by the action of a beveled stud or projection, I⁴, extending laterally from the latch W³.

The outer end of the sleeve P², upon shaft O², is provided with a fixed crank, I⁶, connected by a pitman or rod, J⁴, with a bell-crank lever, K⁴, by which the belt-shifter G² is operated.

The operation of the invention is as follows: When the machine is started, motion is imparted from the cylinder-shaft to the shaft O², and thence, through the spur-wheel R⁵ and pinion S², to the governor. As the latter attains speed, the stem X² is depressed, thus causing the link Z² to operate the lever A³, which latter serves to depress the stem X⁶ against the tension of the spring D³. Collar F³ of stem X⁶ engages the stud I³ of lever J³, which lifts or elevates the sliding bar N³, the projection P⁵ of which will strike the lever E⁴ and operate the trigger Z³ when the arm U³ reaches the said projection P⁵ in the course of the revolution of the shaft O². The latch W³ is thus thrown into engagement with one of the studs X³ of the disk T³, which latter will make a one-half revolution, it having first been released from the lever-catch G⁴ by the action of the stud I⁴, as above set forth. When the half-revolution of disk T³ has been completed, the latch W³ engages the set-screw G⁴ of arm F⁴, by the action of which it is thrown out of engagement with the periphery of disk T³, the revolution of which then ceases. The effect of this half-revolution of the disk T³ and crank I⁴ has been to operate the belt-shifter G² and throw the belt D² upon the fixed pulley F² of the shaft E, thus starting the feed mechanism. When the speed slackens, a reverse operation takes place. The stem X⁶ is then forced upward by the action of spring D³, the bar N³ is lowered, bringing its arm P³ in contact with lever E⁴, operating the latter, tripping the latch, and causing disk T³ again to make a one-half revolution, thus returning the crank I⁴ to its original position and causing the belt-shifter to restore the belt to the loose pulley of shaft E, thus stopping the feed mechanism.

In Fig. 1 of the drawings I have shown a method of connecting the device to a thrashing-machine for operation. The thrashing-machine is provided, near the front end of its feed-board, with brackets N⁴, to which the feeder is hinged, it being sustained in position for operation by means of a boom, O⁴, pivoted on top of the separator, and having guy-ropes or adjusting and sustaining lines P⁴. When the feeder is not in use, it may be thrown back upon the deck of the separator. When this method of attachment is carried out into effect, it will be preferable to arrange the governing and regulating mechanism under the feed-board of the separator, which may be easily done by a suitable arrangement of the parts connecting rods, belts, &c.; and we reserve to ourselves the right to make these changes or any other alterations which may be made without departing from the spirit of our invention.

Having described our invention, we claim and desire to secure by Letters Patent of the United States—

1. In a band-cutter and feeder for thrashing-machines, the combination, with the main frame and an endless feed-apron, of laterally-extended inclined feed-boards having vertical flanges or guides, and reciprocating curved band-cutting knives, substantially as described.

2. The combination, with an endless bundle-carrying apron, of longitudinally-reciprocating feed-bars, the cranks actuating these bars, and band-cutting knives applied to them, substantially as described.

3. The combination, with the longitudinally-reciprocating feed-bars, of the flexible strips secured to the under sides of the same, and interposed springs, substantially as set forth.

4. The combination, with the longitudinally-reciprocating feed-bars, of the flexible strips secured to the under sides of the same, the corrugated metal straps secured to said flexible strips, and the springs interposed between the latter and the feed-bars, substantially as set forth.

5. The combination of the endless feed-apron with the reciprocating feed-bars having the flexible metal-shod strips, and provided with band-cutters at their front ends, as set forth.

6. The endless apron provided with transverse sheaths, in combination with the slats or bars in said sheaths, substantially as set forth.

7. The combination of the endless feed-apron, the reciprocating feed-bars arranged above the same, equipped with band-cutters at their front ends, an inclined plane leading from the rear end of the apron to the thrashing-cylinder, and a series of serrated feed-bars mounted upon a crank-shaft, and having their free ends resting upon the inclined board, as set forth.

8. The combination of a thrashing-cylinder, a feeding mechanism, a governor, and mechanism controlled by said governor, whereby the said cylinder on attaining working velocity engages and operates the feeder, and on losing working velocity is disengaged therefrom, substantially as set forth.

In testimony that we claim the foregoing as our own we affix our signatures in presence of two witnesses.

F. M. MONGER.
R. E. MONGER.

Witnesses:
ROBERT WILLIAMSON,
SAMUEL C. MITCHELL.